Dec. 14, 1965 A. A. JORGENSEN 3,223,787

TELEPHONE RINGING CONTROL SYSTEM

Filed Feb. 20, 1961 2 Sheets-Sheet 1

INVENTOR.
ADAM A. JORGENSEN
BY George W. Killian
AGENT

Dec. 14, 1965 A. A. JORGENSEN 3,223,787

TELEPHONE RINGING CONTROL SYSTEM

Filed Feb. 20, 1961

2 Sheets-Sheet 2

United States Patent Office 3,223,787
Patented Dec. 14, 1965

3,223,787
TELEPHONE RINGING CONTROL SYSTEM
Adam A. Jorgensen, Victor, N.Y., assignor, by mesne assignments, to Stromberg-Carlson Corporation, Rochester, N.Y., a corporation of Delaware
Filed Feb. 20, 1961, Ser. No. 90,412
4 Claims. (Cl. 179—84)

Figure 1:
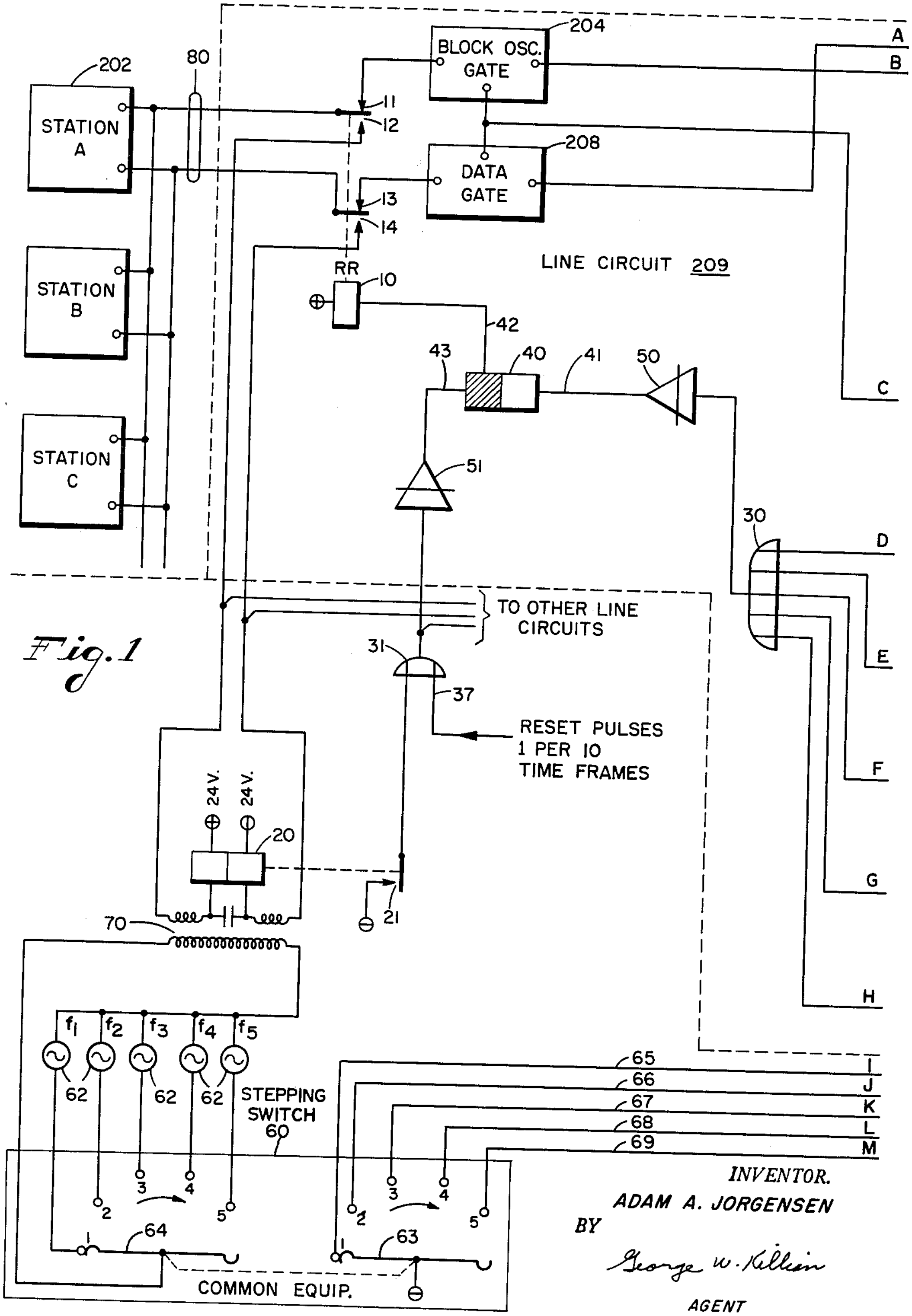

This invention relates to a signaling system and, more particularly, to a new and improved system for applying a calling signal to a desired line in an automatic communication system of the type which provides a plurality of separate communication paths on a single communication channel.

The copending application of Brightman, Serial No. 45,342, filed July 26, 1960, now U.S. Patent No. 3,134,859 and assigned to the same assignee as the present invention, discloses a time division multiplex communication system in which communication between line circuits and trunk circuits is carried on over a speech highway. All of the line circuits are connected to the speech highway and one data highway, while the trunk circuits are connected to the speech highway and to two separate one-way data highways. The system uses "floating" time slots that are assigned to calling circuits, and the calling and called circuits are connected to the speech and data highways under the control of delay lines which circulate calling and called circuit designations in the assigned time slot. The cited Brightman application discloses a means for sending a calling signal over the common communication channel. Since each station which is repetitively connected to the common channel is connected thereto for only a brief interval, it is not possible to pass sufficient power over the communication channel to operate conventional telephone type ringers. Accordingly, electronic telephone communication systems employ a low power consumption signaling device which is conventionally referred to as a tone ringer. The tone ringers emit a beep tone which is not normally associated with a summons to answer a telephone and is, therefore frequently confusing to, or misunderstood by, the listener. In addition, tone ringing techniques require obsoleting existing telephones.

Accordingly, one object of the present invention is to provide new and improved signaling means.

Another object of the present invention is to provide a new and improved means for signaling a called station in an automatic communication system.

Another object is to provide an electronic communication system which is amenable to the use of conventional electromechanical telephone ringers.

Another object is to provide means for selectively signaling a predetermined one of a plurality of ringers connected to a given line.

A further object is to provide a means for detecting and responding to answer supervision from the called line.

A further object is to provide an answer supervision detection means which can monitor and respond to answer supervision from any one of a plurality of lines which are being called.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise two figures on two sheets and which, when arranged in successive order, illustrate parts of the system in block diagram form using logic symbols rather than conventional circuit component symbols which would only tend to mask, or obscure, the inventive features.

Figure 2:
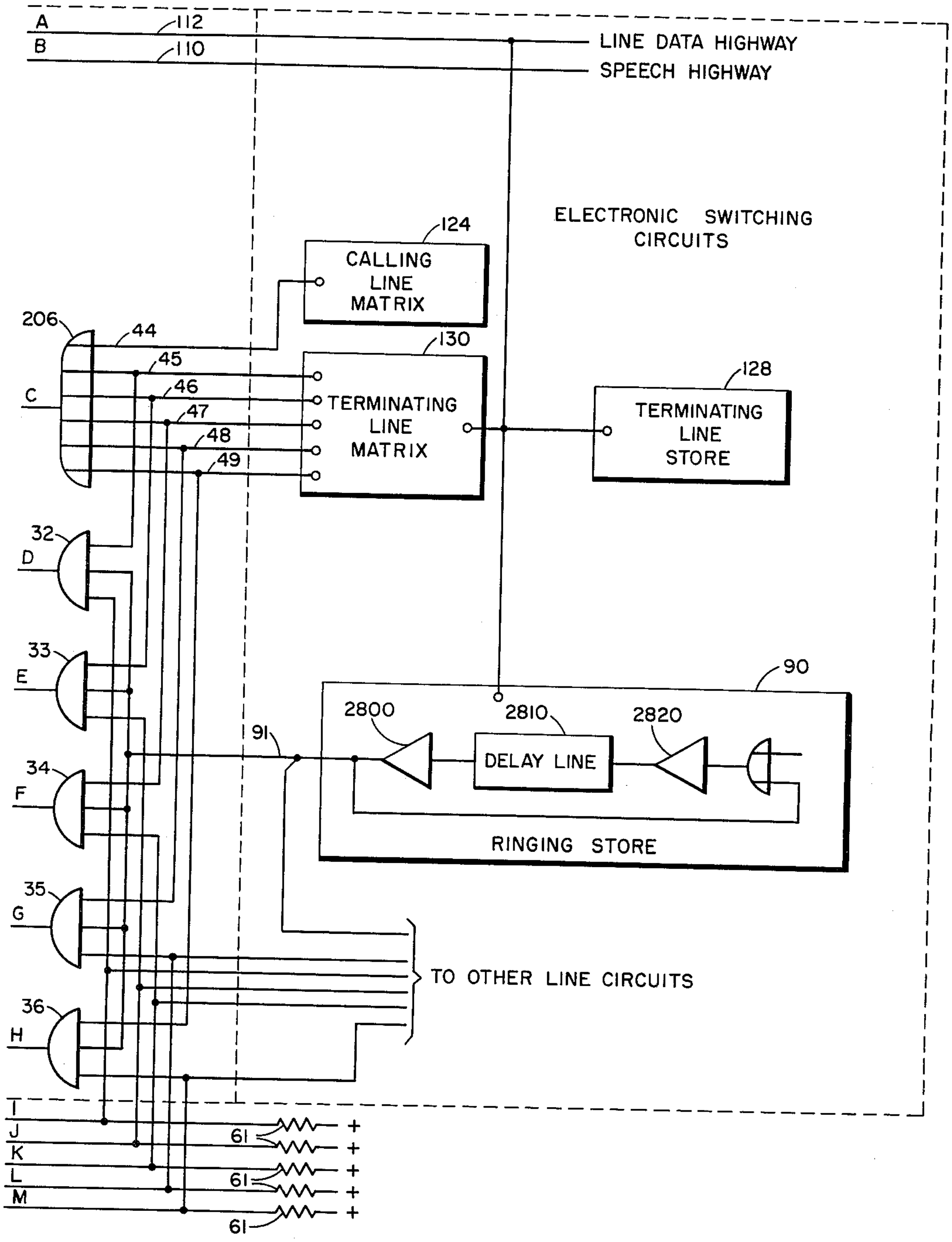

For convenience, the elements of this invention, which correspond closely with similar elements in the cited Brightman application, have been given the same three or four digit numerical designations which are employed in the cited Brightman application; other components are assigned a two-digit identifying number. For example, the bilateral voice gate 204, shown in line circuit 209, corresponds directly with the bilateral voice gate shown in FIGURE 2 of the referenced Brightman application. This gate may comprise a blocking oscillator gate of the type described in detail in the copending application of Pearce and Brightman Serial No. 814,922, filed May 21, 1959, now U.S. Patent No. 3,087,022, which copending application is assigned to the same assignee as the present invention. When a connection is established between a pair of lines, or a line and a trunk, the voice gates in the line circuit and trunk circuits are effective to connect components in these circuits so that bilateral speech transmission takes place by the use of the resonant energy transfer technique described in detail in Conference Paper No. 59-210 by J. C. Perkins, Jr., which was published in Communications and Electronics, January 1960, by The American Institute of Electrical Engineers, and which was entitled "Transmission Aspects of an Electronic Switchboard Employing Time Division Multiplexing." Data gate 208, which is included in line circuit 209, is effective to supply time slot pulses to the line data highway 112 under the control of dial impulses from conventional dialing devices, at the subscriber's telephone, and to control the selective application of time slot pulses to the highway 112 in accordance with the on-hook or off-hook condition of the line. Although many suitable gate circuits for performing these operations are well known in the art, the gate circuit 208 preferably comprises a saturable magnetic core of the type disclosed in the copending application of Beine, Serial No. 323, filed January 4, 1960, now abandoned, which copending application is assigned to the same assignee as the present application. The gate circuit 208 is so arranged that an on-hook condition in the related station, or line circuit, permits the transmission of time slot pulses to the line data highway 112, while an off-hook condition suppresses the transmission of these pulses. Thus, the interruptions in the continuity of the line circuit due to dialing cause the transmission of bursts of time slot signals to the line data highway 112 in accordance with the dialed information.

Elements 206, 30, and 31 represent the logic symbols for OR gates. A typical circuit represented by this symbol is illustrated in FIGURE 24B of the referenced Brightman application. The OR gate includes a plurality of diodes whose anodes are connected together to provide a single output terminal, while the cathodes provide a plurality of individual input terminals. A resistor, with one terminal thereof connected to the output terminal, provides an individual resistive input at the other terminal. When the input terminal of the resistor is connected to ground, or a relatively positive potential, the output of the gate will drop to a negative potential when the anode of one of the diodes is returned to a more negative potential. Thus, these OR gates provide an OR function for negative potentials.

Elements 32–36, inclusive, represent the logic symbols for AND gates. A typical circuit represented by this symbol is illustrated in FIGURE 23B of the referenced Brightman application. The AND gate is similar in design to the OR gate except that the diodes are reversed in polarity. With the resistor input connected to a negative potential, the output of the gate will drop to a negative potential only when all of the individual input terminals are also connected to a negative potential. Thus, these AND gates provide an AND function for negative signals.

Element 40 represents the logic symbol for a flip-flop circuit. A flip-flop circuit is more properly known as an Eccles-Jordan circuit which is a direct-coupled multivibrator circuit with two conditions of stable equilibrium. A typical flip-flop circuit is illustarted in FIGURE 27B of the cited Brightman application. The shaded side of the logic symbol for the flip-flop represents the side which is normally conducting, and at that time, lead 42 is at a positive potential. In response to the application of a positive signal to lead 41, the flip-flop circuit shifts to its other stable position and lead 42 is then shifted to a negative potential. In a similar manner, the flip-flop may be reset by an application of a positive potential to lead 43.

Elements 50 and 51 represent inverters which provide a positive pulse at the output in response to a negative input pulse. The circuits for typical pulse inverters are shown in FIGURES 25B and 26B of the cited Brightman application.

Elements 2800 and 2820 represent simple amplifier circuits which produce at their output terminal an amplified positive input pulse.

Elements 124 and 130 represent, respectively, a calling line matrix and a terminating line matrix which comprise a plurality of gate circuits, as more fully explained in the cited Brightman application.

The terminating line store 128 stores the dialed designation of the called line and party and auxiliary circuits, not shown, determine whether the circuit represented by the dialed number is in an idle or busy condition. In addition, the delay line registers in the terminating line store 128 control translating circuits in the terminating line matrix 130 so that the called line circuit is connected to the highways 110 and 112 in the time position allotted to the calling line circuit, all as more fully set forth in the cited Brightman application. A delay line as used in the terminating line store may comprise a mass of magnetostrictive material 2810 disposed between an input amplifier 2800 and an output amplifier 2820. The input amplifier 2800 responds to negative-going signals applied to its input to apply an input signal to the delay line 2810. At the end of a fixed time interval, an output signal from the delay line 2810 is applied to the output amplifier 2820. The output of this amplifier is normally maintained at a more positive, or ground, potential and drops to a more negative potential in response to the application of a signal to the input of the amplifier 2820 from the delay line 2810. The delay line provides a delay which correpsonds to the length, or time duration, of the time reference frame.

The present invention also employs a ringing store circuit 90 which, like the terminating line store 128, stores information relating to the connection. More specifically, the ringing store 90 causes a circulating pulse stored in a delay line, or delay lines, to be placed on lead 91 in the time position allotted to the calling line circuit. Since the ringing store circuit 90 is ancillary to the present invention, it is believed that a detailed description thereof is unnecessary even though it is not fully described in the referenced Brightman application. Stores of this nature are well known in the art to which this invention pertains.

In the manner more fully set forth in the cited Brightman application, answer supervision from the called station may be detected and used to block the input to certain gate circuits. In the present invention, the answer supervision signal is employed to halt the application of the circulating pulse to lead 91 in the assigned time position.

Element 60 represents generally a stepping switch comprising two banks, each with a wiper which makes one complete revolution per ringing cycle of five or six seconds. Wipers 64 and 63 step in synchronism so that they are always on steps in their respective banks having corresponding numbers. The use of a stepping switch for this application is intended to be illustrative only. In actual practice, suitable electronic circuits may be substituted for the stepping switch 60. Elements 62 represent sources of A.C. potential having varying potential and frequency.

Other symbols used in the drawing are believed to be well known and widely used in the art and/or will be fully explained in the following detailed description.

It is believed that the invention can be more readily understood after considering the following aspects thereof. The illustrated application of the present invention provides means for selectively signaling a predetermined station on a line. Each line in the system has associated therewith a line circuit, such as line circuit 209, which includes an AND gate, such as gates 32–36, for each station on the line. Thus, the illustrated case will accommodate a maximum of five stations since only five AND gates are shown. It will be obvious that private line service may be provided with the use of a single AND gate instead of the plurality of AND gates mentioned and that no OR gate corresponding to OR gate 30 will be required. In order to selectively signal a predetermined one of the five stations on a party line, it is necessary to employ special ringers and ringing potentials. One well known and widely used system employs ringers which are individually tuned to respond to potentials of a predetermined frequency. The ringer to be sounded is activated by the application of the required potential and frequency to the line. Such a system is illustrated in the present drawings and symbols 62 present sources of ringing potential of varying potential and frequency. It should be understood that more or less than five stations may be connected to each line and that other well known ringing selection techniques may be employed.

It is well known in telephone practice to sound the ringer at the called station for approximately one second per five or six second time cycle. Such a timing cycle is usually controlled by suitable means, such as stepping switch 60, which may be controlled, by means not shown, to step approximately one step per second, thereby successively applying the various potentials 62 to the primary winding of transformer 70. Such circuitry may be designated as a signaling generator. It is immediately evident that the potential induced in the secondary of transformer 70 will be applied to the line 80 only when ringing relay 10 is operated. Accordingly, it will be shown that if it is desired to apply the potential connected to step 3 of the stepping switch 60 to the line 80, relay 10 will be operated only when the stepping switch is on step 3. Very briefly, part of this control includes an additional wiper 63 on the stepping switch 60 which applies a suitable potential to each terminal in turn.

It is well known that the ringing circuits employed in conventional telephone instruments include a capacitor which is effective to block the flow of D.C. current and that, in response to answer supervision at the called station, a D.C. circuit is completed which operates a relay. Such a circuit is shown, for example, in Patent No. 2,854,522 to Killian, which patent is assigned to the same assignee as the present invention. Relay 440 of the last named patent is used to respond to answer supervision by operating in response to the flow of D.C. current. Relay 20 of the present invention functions in the same basic manner. However, it should be observed that relay 20 connects to a plurality of line circuits and that more than one of the plurality of line circuits may have signaling potential applied thereto simultaneously. Thus, relay 20 serves as a ring trip relay for a plurality of lines simultaneously, while relay 440 of the last cited patent may serve as a ring trip relay for only one line at a time. The operation of relay 20 will cause a brief interruption in the application of ringing potential to all of the lines connected thereto. However, it will be shown that within a very brief interval, one or two cycles of ringing potential, the ringing potential will be reapplied to all of the lines save the one from which answer supervision was received.

With the above summary in mind, it is believed that the inventive features of this invention can best be understood by tracing the extension of the signaling potential to a line connected to the electronic telephone system. Assume, for example, that it is desired to extend a connection to station C connected to line 80. The manner of extending the connection and for assigning a time position on the speech and data highway is fully described in the cited Brightman application. As stated, a system incorporating the present invention may have a plurality of subscribers on a given line. Of course, each subscriber has an individual, distinctive telephone number designation assigned to him. The extension of the connection may be briefly summarized as follows. In response to the initiation of the connection by the calling party, an idle time position is allotted to the calling line and for the duration of the connection a signal is applied, once per time reference frame, to lead 44 of the OR gate in the calling line circuit corresponding to gate 206 in called line circuit 209. In response to the signal passed through the OR gate, the calling line is repetitively connected to the line data highway 112 and the speech highway 110. Bursts of time slot signals indicative of the dialed digits representing the designation of the called station are transmitted to the line data highway 112 and stored as circulating pulses in delay lines included in the terminating line store 128. After the complete registration of the called number, the terminating line matrix 130 causes a signal to be placed, once per time reference frame, on a selected one of the plurality of leads designated 45–49, inclusive, and corresponding to the desired station on the selected line, in the present example, lead 47. For example, lead 45 corresponds to station A on line 80, lead 46 to station B, and so on. The pulses that appear on the selected one of the leads 45–49 are synchronized with the time slot pulses applied to the calling line circuit and passed through OR gate 206 to operate the blocking oscillator gate 204 to connect the two line circuits together on the speech highway during the same time interval, as more fully explained in the cited Brightman application.

It will be observed that the pulse applied to the selected one of the leads 45–49 will also be applied to one of the AND gates 32–36. As mentioned, each station on the line has a corresponding AND gate. Thus, AND gate 32 may be associated with station A on line 80, while AND gate 33 may be associated with station B, and so on. Accordingly, an enabling pulse is applied to the AND gate corresponding to the selected station on the called line, in the present example, gate 34.

The dialed information indicative of the called station and line is also stored in the ringing store circuit 90, which comprises a group of delay lines, such as delay line 2810. During the assigned time slot, the ringing store circuit 90 applies an enabling pulse to each of the AND gates 32–36 on the lead 91. The particular one of the AND gates corresponding to the called station will thus have two of the three enabling leads repetitively enabled during the same time slot. The gate corresponding to the called station will be finally enabled by the application of a negative potential to the third enabling lead once per five or six second cycle by wiper 63 of the stepping switch 60, as explained above.

To summarize, only one of the five gates 32–36 may be fully enabled by the control signals from the terminating line matrix 130 at a given instant; and a predetermined one of the five gates will be enabled only once during each ringing period when a particular station on the associated line is called. If station C is called, AND gate 34 will be enabled and allowed to pass a pulse to OR gate 30. Lead 47 is enabled during the time position assigned to the calling line as controlled by the terminating line matrix 130; lead 91 is enabled during the same time position once per time reference frame until the call is answered; and, finally, lead 67 has an enabling potential only during the ringing time for the selected ringing potential and frequency.

The negative pulse passed through AND gate 34 and OR gate 30 is inverted and amplified by inverter 50 to apply a positive pulse to flip-flop circuit 40, thereby causing lead 42 to be placed at a negative potential to operate relay 10. In response to the operation of relay 10, contacts 11 and 13 will open and contacts 12 and 14 will close to couple line 80 to the ringing potential 62 connected to step 3 of the stepping switch 60. It should be observed that as long as the stepping switch is on step 3, that a positive pulse will be applied to lead 41 once per time frame. For the circuit values and conditions described in the cited Brightman application, this repetitive pulse occurs once every eighty microseconds. Accordingly, should any pulse tend to reset the flip-flop circuit 40 in a manner to release relay 10, the flip-flop will be restored to its other stable condition, wherein relay 10 is operated, within eighty microseconds, a time interval which is not nearly sufficient to permit relay 10 to release. For reasons that will be more fully explained below, reset pulses are applied to the flip-flop circuit every one thousand microseconds.

When the stepping switch 60 advances to station 4, AND gate 34 will no longer be enabled and the next reset pulse will pass through OR gate 31, be inverted and amplified by inverter 51, to reset flip-flop 40, thereby returning lead 42 to a positive potential and causing relay 10 to release. The release of relay 10 reopens contacts 12 and 14, thereby disconnecting any signaling potential from line 80. Answer supervision from the called line may occur either during the ringing period or during the silent period; that is to say, either while relay 10 is operated or while relay 10 is released. When answer supervision occurs during the silent period, the answer supervisory signal is immediately passed to the line data highway 112 in the assigned time slot in the manner more fully explained in the referenced Brightman application. In response to this signal, the ringing store circuit 90 erases the pulse stored in the time slot assigned to the calling line, thereby preventing the placing of an enabling potential on lead 91 in a time position corresponding with the time position during which a repetitive pulse is placed on lead 47 to control the gate circuits 204 in the calling and called line circuits to connect them to the speech highway 110 during the same time position. Accordingly, any further operation of flip-flop 40 and relay 10 is inhibited.

When the answer supervision occurs during the ringing period, a direct current loop will be created through the called line, thereby operating relay 20 which closes contacts 21 to cause a negative signal to be passed through OR gate 31 in the same manner that the negative signal was passed through the OR gate on lead 37, and with the same consequences of resetting flip-flop 40 to release relay 10. As long as relay 20 is held operated, the flip-flop circuit 40 will be maintained in its reset condition. With flip-flop 40 reset, a positive potential is placed on lead 42, thereby releasing relay 10. The release of relay 10 will cause line 80 to be reconnected to the blocking oscillator gate 204 and the data gate 208, thereby providing an electronic ring trip, as described above.

Accordingly, in response to an answer supervision during either the silent or ringing period, any further ringing of the called station will be inhibited.

It should be observed that since relay 20 may be simultaneously coupled to a plurality of lines, that an answer supervision signal from any one of the plurality of lines may result in the release of relay 10. If the answer supervision did not come from line 80, a reoperate signal will be received through AND gate 34 to reoperate relay 10 within eighty microseconds after the relay corresponding to relay 10 in the line circuit from which the answer supervision signal was received releases. The line from which the answer supervision signal was received will be disconnected from relay 20, thereby permitting the reoperation of relay 10 in any line requiring the continuation of ringing potential. The described action occurs in such a short period of time that the loss of ringing potential to the ringers affected will not be detected by any person with normal hearing acuity. Tests have shown that, at most, approximately two cycles of the ringing potential may be lost.

Resistors 61 are connected to leads 65–69, inclusive, in order to maintain these leads at a positive potential when wiper 63 is not applying a negative potential thereto.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In combination, a plurality of line circuits each including a line, at least one station coupled to each of said lines, each station including means capable of returning answer supervision after being signaled, a signal generator common to said line circuits for selectively signaling the stations on said lines, an answer supervision detector common to said line circuits for detecting the return of answer supervision from said stations, switching means associated with each line circuit for coupling and decoupling said signal generator and said answer supervision detector to and from the line of its associated line circuit, common control means for controlling said switching means and including means for storing signaling information for controlling which switching means are to be actuated to couple said signaling generator and said answer supervision detector to said lines, said common control means further including means coupled between said means for storing and said switching means for actuating various ones of said switching means depending upon said signaling information stored within said means for storing, said common control means further including means responsive to the detection of said answer supervision signal from a particular line by said answer supervision detector for altering the signaling information pertaining to said particular line stored within said means for storing to disconnect said signaling generator from said particular line.

2. The combination as set worth in claim 1 wherein certain of said lines are coupled to N stations and said signal generator sequentially generates N different types of selecting signals, N being an integer.

3. In combination, a plurality of line circuits, at least one station having a distinctive designation corresponding to each of said line circuits, a line connecting each line circuit to its corresponding station, each station including means thereat capable of returning an answer supervision signal to the line circuit with which it corresponds in response to that station being signaled, first common means including storage means for storing the respective designations of those stations to be signaled, and means coupled to each of said line circuits and said storage means for altering the designation of any station within said storage means in response to an answer supervision signal emanating from that station being applied thereto, second common means including signaling means and an answer supervision signal detector, each of said line circuits including transfer switch means for selectively connecting the line thereof to said second common means in a first position thereof and to said means for altering in a second position thereof, means responsive to the storage of the designation of any station for switching the transfer switch of the line circuit to which the station corresponds to said first position thereof, whereby any station having its designation stored in said storage means will be signaled by said signaling means of said second common means and said answer supervision signal detector of said second common means will be coupled to the line of any station being signaled, means coupled to said answer supervision signal detector responsive to the receipt of an answer supervision signal from any station for switching all transfer switches to said second position thereof so long as said answer supervision signal is being received by said answer supervision signal detector.

4. The combination as set forth in claim 3 wherein certain of said lines are coupled to N stations and said signal generator sequentially generates N different types of selecting signals, N being an integer.

References Cited by the Examiner

UNITED STATES PATENTS 2,617,872 11/1952 Herrick ------------ 340—156

ROBERT H. ROSE, *Primary Examiner.*

STEPHEN W. CAPELLI, NEIL C. READ, *Examiners.*